United States Patent [19]

Takigawa et al.

[11] 4,266,592
[45] May 12, 1981

[54] PNEUMATIC TIRE FOR A HEAVY DUTY VEHICLE

[75] Inventors: Hiroyoshi Takigawa, Kodaira; Iwao Arimura, Hamura; Makoto Tanaka, Kodaira; Shinichiro Ohkuni, Tokyo, all of Japan

[73] Assignee: Bridgestone Tire Company Limited, Tokyo, Japan

[21] Appl. No.: 63,883

[22] Filed: Aug. 3, 1979

[30] Foreign Application Priority Data

Aug. 4, 1978 [JP] Japan .................. 53-94490

[51] Int. Cl.³ .......................... B60C 11/00
[52] U.S. Cl. .................. 152/209 D; D12/142; D12/146
[58] Field of Search ....... 192/209 D, 209 R, 209 WT, 192/209 NT, 330 R, 352 R; D12/142, 143, 146, 147, 149, 150, 141

[56] References Cited

U.S. PATENT DOCUMENTS 3,115,919  12/1963  Roberts ................ 152/209 R
3,550,665  12/1970  Verdier ................ 152/209 R
3,645,313   2/1972  Roberts et al. ........ 152/209 R
4,031,938   6/1977  Verdier ............... 152/209 R

FOREIGN PATENT DOCUMENTS 116250  12/1942  Australia ............. 152/209 R

Primary Examiner—John T. Goolkasian
Assistant Examiner—Thomas E. Bokan
Attorney, Agent, or Firm—Sughrue, Rothwell, Mion, Zinn and Macpeak

[57] ABSTRACT

A pneumatic tire for a heavy duty vehicle including a tread surface divided along circumferential directions by at least two tread zigzag grooves to form a plurality of circumferential zigzag ribs comprises stress releasing apertures formed at least in zones of the circumferential ribs which are within distances approximately 30% of widths of the circumferential ribs from the side of the ribs to mitigate stress concentrations in corners of the ribs extending in the tread grooves by reducing rigidities of the corners for preventing railway wear which would otherwise occur in the tire of this kind.

18 Claims, 12 Drawing Figures

FIG._1 _PRIOR ART_
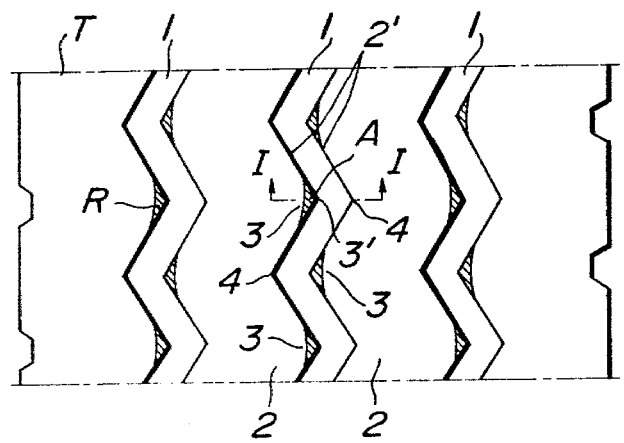
FIG._1a _PRIOR ART_
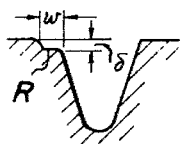
FIG._2a
_PRIOR ART_
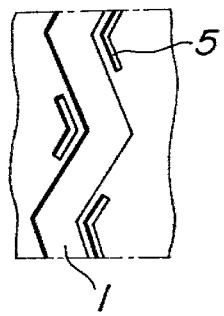
FIG._2b
_PRIOR ART_
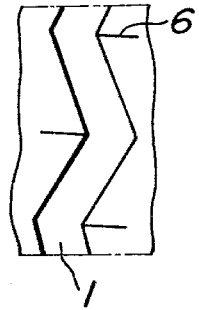

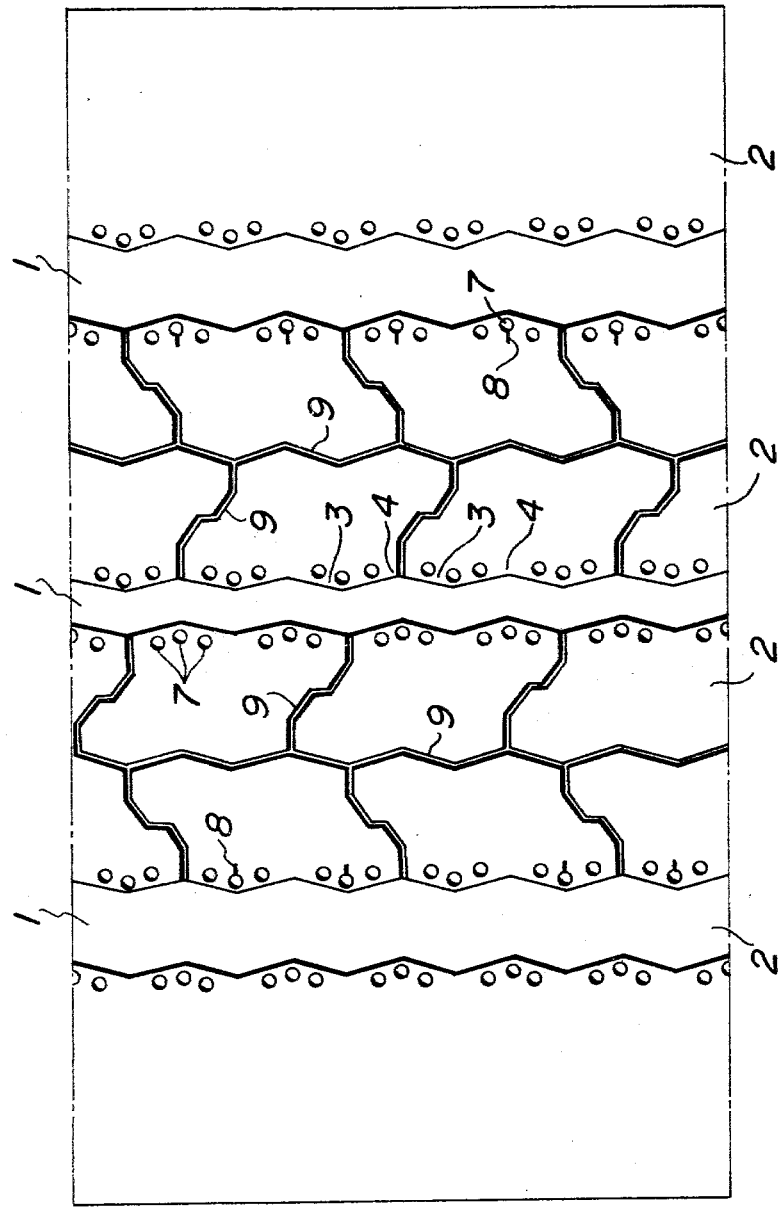

PNEUMATIC TIRE FOR A HEAVY DUTY VEHICLE

BACKGROUND OF THE INVENTION

1. Field of the Invention

The present invention relates to a pneumatic tire for a heavy duty vehicle, and more particularly to a tire capable of mitigating railway wear which would often occur in the tire of this kind used for continuous travelling at high speed for long distances.

2. Description of the Prior Art

In general, a radial tire including metal cords for the reinforcement of belts has various advantages such as high wear-resistant property, punctureproof and the like, because of the tough belts arranged between the tread rubber and carcass plies, which are different from those of usual bias tires. However, such a radial tire is inferior in comfortability to drive because of the reinforced rigid belts. Apart from use on bad roads, accordingly, radial tires for good roads have been developed and in recent years the demand for the radial tires has been greatly increased as the road situation improves with development and completion of superhighways.

For such applications, the tread of the tire is formed with circumferentially extending zigzag ribs in view of the traction and brake performances and wear-resistant property and for preventing heating in consideration of the circumferentially extending zigzag patterns in the conventional tires. Such a tread pattern is generally referred to as "rib-type" pattern.

Such ribs are usually continuous in the circumferential direction of the tire. It has been found that extraordinary wears (referred to as "irregular" wear hereinafter) which never occurred in tires, occur upon straight continuous travelling for long distances at high speeds.

SUMMARY OF THE INVENTION

It is therefore an object of the invention to provide an improved pneumatic tire for heavy duty vehicles, which eliminates the disadvantage of the radial tire of this kind.

It is another object of the invention to provide a pneumatic tire for a heavy duty vehicle, which comprises a tread pattern capable of mitigating railway wear which would often occur in the tire of this kind, by reducing rigidities of corners of the tread pattern ribs to release stress concentrations therein.

The pneumatic tire for a heavy duty vehicle includes a tread surface divided along circumferential directions by at least two tread grooves in zigzag whose sides extend into said tread surface to form a plurality of circumferential zigzag ribs. The invention comprises stress releasing apertures (a) formed at least in zones of said circumferential ribs which are within distances approximately 30% of widths of the circumferential ribs from the sides thereof; (b) said apertures formed in extending corners of the ribs being more than those formed in retracting corners adjacent thereto; (c) said apertures formed in the extending corners of the ribs being more than those in central zone of the ribs; and (d) depths of said apertures being 0.3–1 time of depths of the tread grooves.

The invention will be more fully understood by referring to the following detailed specification and claims taken in connection with the appended drawings.

BRIEF DESCRIPTION OF THE DRAWINGS

FIG. 1 is a development view of a tread pattern of a tire of the prior art illustrating a worn condition;

FIG. 1a is a sectional view of the rib taken along the line I—I in FIG. 1;

FIGS. 2a and 2b show ribs exemplarily illustrating irregular wear preventing means of tires of the prior art;

FIG. 5 is a development view of a tread pattern of another embodiment of the invention.

DETAILED DESCRIPTION OF THE PREFERRED EMBODIMENTS

Figure 3:
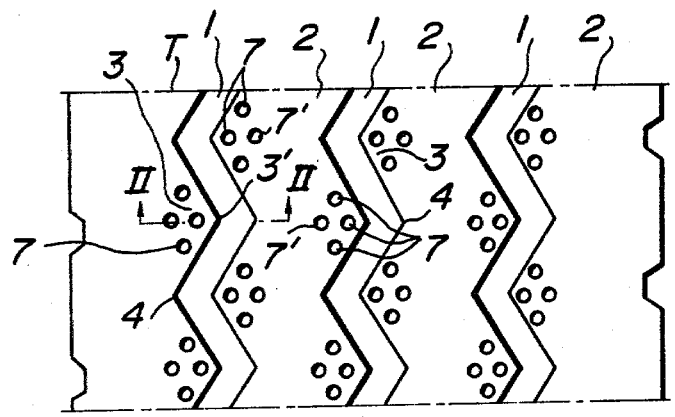
FIG. 3 is a development view of a tread pattern of a tire according to the invention.

FIG. 1 illustrates a pattern of a tread of a tire of the prior art, wherein tread grooves 1 extend in zigzag in a circumferential direction of the tire T, and circumferential ribs 2 therebetween include corners 3 extending in directions of the tire width. With this tire, irregular wears tend to occur at the corners 3, particularly extreme ends thereof at the beginning of the use and grow along the sides 2' of the ribs in the circumferential and width directions of the tire during the middle stage of the use as shown in shaded portions A. After the middle stage the irregular wear greatly increases as shown at R having a depth δ and a width w as shown in FIG. 1a. The worn portions A progressively increase with travelled distances after the middle stage until the adjacent worn portions A communicate with each other along the sides 2' of the circumferential ribs 2, and the portions R further grow with greater depth δ and width w as the travelled distances increase. Such irregular wear is generally referred to as "railway" wear which makes the appearance of the tire unaesthetical with the worn edges of the grooves and adversely affects the tire performance relied upon the edges of the tread grooves, such as the traction capacity and braking performance to considerably shorten the life of the tire.

It has been known that such railway wear would result from stress concentrations in traverse directions in the proximities of the extreme ends 3' of the corners 3 of the circumferential ribs 2 in continuous travelling at high speeds. In view of this, various attempts have been suggested.

One is shown in FIG. 2a, wherein relatively elongated stress releasing grooves 5 are provided in the vicinities of the corners 3 of the ribs separate from the grooves 1. Another is shown in FIG. 2b, wherein in the corners 3 of the ribs are provided thin slits 6 parallel to the directions of the width and opening into the grooves 1 at the extreme ends 3' of the corners 3. Although the former is effective to release the stresses, there is a tendency for the wearing on both sides of the grooves 5 to be different in radial cross-sections of the tire to form steps during the middle and last stages. The latter is also effective to prevent such irregular wear at the beginning stage. However, there is also a tendency for the wearing on circumferentially front and rear sides of the slits 6 to be different in the radial cross-sections of the tire to form steps (heel and toe wears). In addition, cracks occur in the ribs at the ends remote from the grooves to tear off parts of the ribs.

The tire according to the present invention will be explained hereinafter with applications to tires (1000R20, 14PR) including usual metal belts and metal carcasses for trucks and buses.

Figure 3A:
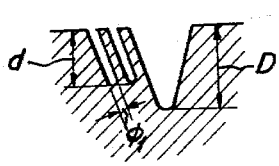
FIG. 3a is a sectional view taken along the line II—II in FIG. 3.

Referring to FIG. 3 illustrating one embodiment of the invention, four stress releasing apertures 7 are provided in each corner 3 of circumferential ribs 2 to locate the central ones among them in alignment with an extreme end 3' of the corner 3. The aperture 7 in this embodiment has a diameter of 1.2 mm and a depth d which is of 0.7 time of the depth D of the tread groove 1 and is parallel to the sidewall of the groove 1 as shown in FIG. 3a. The apertures 7 adjacent to the groove are preferably spaced apart approximately 2 mm from sides of the circumferential rib and spaced apart about 4 mm from one another. The depth d of the apertures is preferably of 0.3-1 the depth D of the tread groove 1 by reason that the depth d less than 0.3 time of D is ineffective to release the stresses but the depth d more than D is meaningless because the apertures 7 are not necessary during the last period of complete wearing of the tire.

Figure 3B:
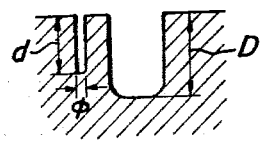
FIG. 3b is a sectional view similar to that in FIG. 3a showing another embodiment of the invention.
Figure 4A:
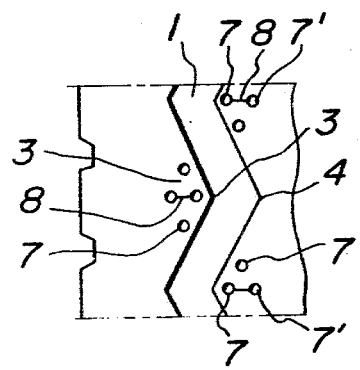
FIGS. 4a, 4b and 4c show tread patterns of other embodiments of the invention.
Figure 4B:
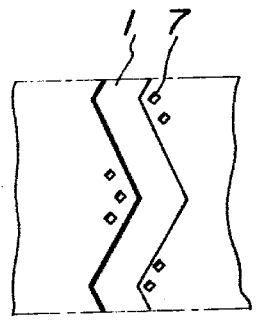
Figure 4C:
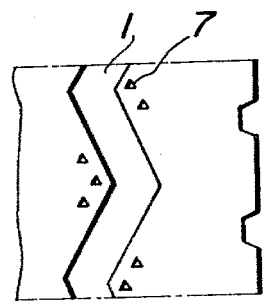

The sectional configuration of the tread groove is a V-shape as shown in FIG. 3a. It may be a U-shape as shown in FIG. 3b wherein only one aperture is provided in each corner of the rib. The apertures are preferably circular or elliptical in cross-section or may be of an elongated cross-section or particular sections as shown in FIGS. 4b and 4c. With the apertures other than the circular cross-sectional apertures, however, ratios of the maximum diameters of the minimum diameters are preferably in the order of 1-3, more preferably 1-1.5. In the cases of the triangular and rectangular apertures, the maximum or minimum sides in cross-section correspond to the above maximum or minimum diameters. In the cases of pentagonal or polygonal apertures, dimensions are determined according to those of the circular, elliptical or rectangular apertures within the principle of the invention. The number of the apertures in one corner of the rib is one or more, preferably plural. The apertures near the tread grooves may be provided with branches to communicate with the grooves, so that the apertures partially open in the grooves to improve drainage.

FIG. 5 illustrates another embodiment of the invention, circumferential ribs are divided into smaller sections by narrow grooves 9. The apertures 7 may be provided with a slit 8.

Figure 3C:
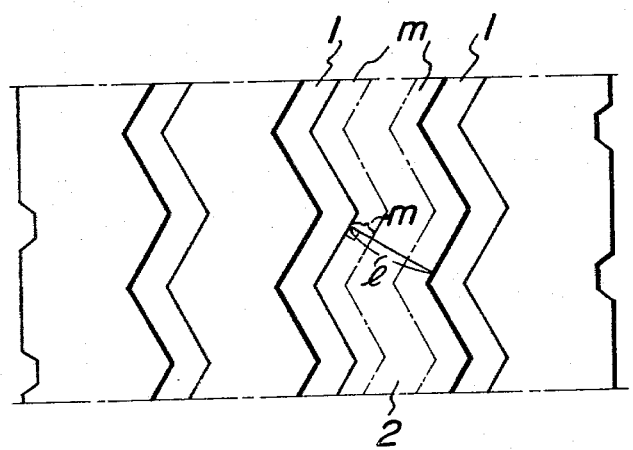
FIG. 3c is a plan view of a pattern of a tire illustrating rib zones in connection with the present invention.

The apertures 7 which is substantially circular in cross-section has a diameter of 0.5-4 mm, preferably 0.75-2 mm. The aperture whose diameter is less than 0.5 mm is ineffective for this purpose. The aperture more than 4 mm causes an irregular wear in the rib around the aperture. A plurality of the apertures 7 are preferably spaced apart 2-5 mm from one another. The apertures are preferably arranged within the distance 0.5-10 mm from the sides of the ribs 2. The distance from the side of the rib is determined by measuring in a direction at right angles to the side of the rib, which is so-called the "minimum" distance. The apertures are preferably in parallel with the sidewall of the tread groove 1 as shown in FIG. 3a or 3b, and more preferably enlarged progressively in their depth direction. At least one among the apertures in each the corner 3 is arranged the rib zone m between the sides of the rib and dot-and-dash lines in FIG. 3c at the locations approximately 30% of the width l of the rib from the sides thereof. The width l of the rib and the width of the zone m are measured in directions perpendicular to the sides of the rib as shown in FIG. 3c. The widths of particular shaped ribs other than those shown in the drawings are determined in the similar manner to the above. More apertures 7 are arranged in the extending corners 3 than in retracting corners 4 adjacent thereto and central zone of the rib, so that the ratio of the areas occupied by the apertures to the area of the relevant corner is increased to reduce the rigidity of the corner, which is the important feature of the invention. The difference in rigidity between the extending and retracting corners is preferably achieved by sizes, shapes and the like of the apertures and the number of the apertures in the extending corners. One aperture 7' may be provided in each corner 3 near its central zone without reducing the rigidity of this zone for accomplishing the object of the invention. Moreover, a plurality of the apertures 7 and 7' may communicate with each other through slits 8 as shown in FIG. 4a.

The effects of the present invention are as follows.

Stress concentrations in the proximities of the extending corners of the circumferential ribs were measured on tires X of the prior art provided with stress releasing grooves 5 as shown in FIG. 2a (having a width 2 mm and a length 20 mm and parallel to and spaced apart 3 mm from sides of the ribs) and tires Y of the prior art including slits 6 as shown in FIG. 2b (having a length 10 mm and a width 0.5 mm) and tires Z according to the present invention as shown in FIG. 3. These tires X, Y and Z were substantially the same in internal construction. Stresses by which determined amounts of deformations are produced were measured and stress concentrations were indicated by index numbers of the measured stresses when stresses on tires not including any stress releasing grooves or slits were 100. The results shown in the following table.

|  | Prior art | | Present invention |
| --- | --- | --- | --- |
|  | X | Y | Z |
| Stress concentration | 70 | 75 | 68 |

As can be seen from the above table, the stress concentrations in the tires according to the invention were slightly less than those of the prior art.

After travelling on usual superhighways with normal internal pressure and normally loaded condition, the tires X, Y and Z exhibited good effects for the railway wear in comparison with the tires not including the stress releasing means. However, at the last stage of the tire during which the complete wearing progressed, other irregular wear occurred starting from the stress releasing grooves in width directions of the tire X and heel and toe wear and cracks at the slits occurred in the tire Y. In contrast herewith, the tires Z according to the invention did not give rise to any noticeable trouble until the end.

As can be seen from the above explanation the present invention removes the disadvantages of the hitherto used tires including the stress releasing means for the railway wear and provide the tire exhibiting a performance equal or superior to those of the hitherto used tires.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a pneumatic tire for a heavy duty vehicle including a tread surface divided along circumferential directions by at least two zigzag tread grooves having sides extending into said tread surface to form a plurality of circumferential zigzag ribs having corners and a central zone, the improvement comprising:

stress releasing apertures
   (a) formed at least in zones of said circumferential ribs which are within distances approximately 30% of widths of the circumferential ribs from the sides thereof;
   (b) said apertures formed in extending corners of the ribs being more than those formed in retracting corners adjacent thereto;
   (c) said apertures formed in the extending corners of the ribs being greater in number than those in said central zone of the ribs; and
   (d) depths of said apertures being 0.3–1.0 of depths of the tread grooves.

2. A tire as set forth in claim 1, wherein said circumferential ribs are continuous.

3. A tire as set forth in claim 1, wherein said circumferential ribs are discontinuous.

4. A tire as set forth in claim 1, wherein said tire is a radial tire.

5. A tire as set forth in claim 1, wherein said zones in which said apertures are formed are within distances approximately 20% of the widths of the circumferential ribs from the sides thereof.

6. A tire as set forth in claim 1, wherein a ratio of the maximum diameters to the minimum diameters of said apertures is 1–3.

7. A tire as set forth in claim 1, wherein said apertures are formed in the extending corners near central zone of the circumferential ribs intermediate the zigzag grooves and the circumferential ribs in the shoulders of the tire having apertures formed in the extending corners only.

8. A tire as set forth in claim 1, wherein at least one of said apertures is formed in each said extending corner but none of the apertures are formed in said retracting corners.

9. A tire as set forth in claim 1, wherein said apertures are substantially circular in cross-section.

10. A tire as set forth in claim 1, wherein said apertures are substantially elliptical.

11. A tire as set forth in claim 1, wherein said apertures are plural.

12. A tire as set forth in claims 1 and 7, wherein said apertures are communicated with each other through narrow slits.

13. A tire as set forth in claims 1 and 5, wherein diameters of said apertures are 0.5–4 mm.

14. A tire as set forth in claims 1 and 5, wherein diameters of said apertures are 1–2 mm.

15. A tire as set forth in claims 1 and 7, wherein said apertures are spaced apart 2–5 mm from one another.

16. A tire as set forth in claims 1, 6 and 7, wherein said apertures are partially opening in sidewalls of said tread grooves.

17. A tire as set forth in claim 1, wherein said apertures are spaced 0.5–10 mm from the sides of the circumferential ribs.

18. A tire as set forth in claim 1, wherein said apertures are progressively enlarged in their depth directions.

* * * * *